United States Patent [19]

Yamada et al.

[11] Patent Number: 5,490,791

[45] Date of Patent: Feb. 13, 1996

[54] CARD EDGE CONNECTORS

[75] Inventors: Shoji Yamada, Machida; Yoshitsugu Fujiura, Tokyo, both of Japan

[73] Assignee: The Whitaker Corporation, Wilmington, Del.

[21] Appl. No.: 143,409

[22] Filed: Oct. 26, 1993

[30] Foreign Application Priority Data

Dec. 28, 1992 [JP] Japan .................. 4-092948 U

[51] Int. Cl.⁶ .................. H01R 13/635; H05K 7/10
[52] U.S. Cl. .................. 439/159; 361/684; 439/541.5
[58] Field of Search .................. 439/64, 540, 159, 439/541.5; 361/684, 685, 686

[56] References Cited

U.S. PATENT DOCUMENTS 5,176,523  1/1993  Lai ............................. 439/64
5,318,452  6/1994  Brennian, Jr. et al. ........... 439/64 X
5,324,204  6/1994  Lwee ........................... 439/64

*Primary Examiner*—Neil Abrams
*Attorney, Agent, or Firm*—Adrian J. LaRue; Timothy J. Aberle

[57] ABSTRACT

The card edge connector (1) has frames (2) facing each other. Partition (14) is secured by means of lances (60) retained by protrusions made in the main body (16). By inserting partition (14), one can obtain cavities (28) formed on both sides of the partition for accommodating thin cards. By removing partition (14) one can obtain a single cavity (29), thus cavities (28) can be combined to accommodate thick cards.

16 Claims, 7 Drawing Sheets

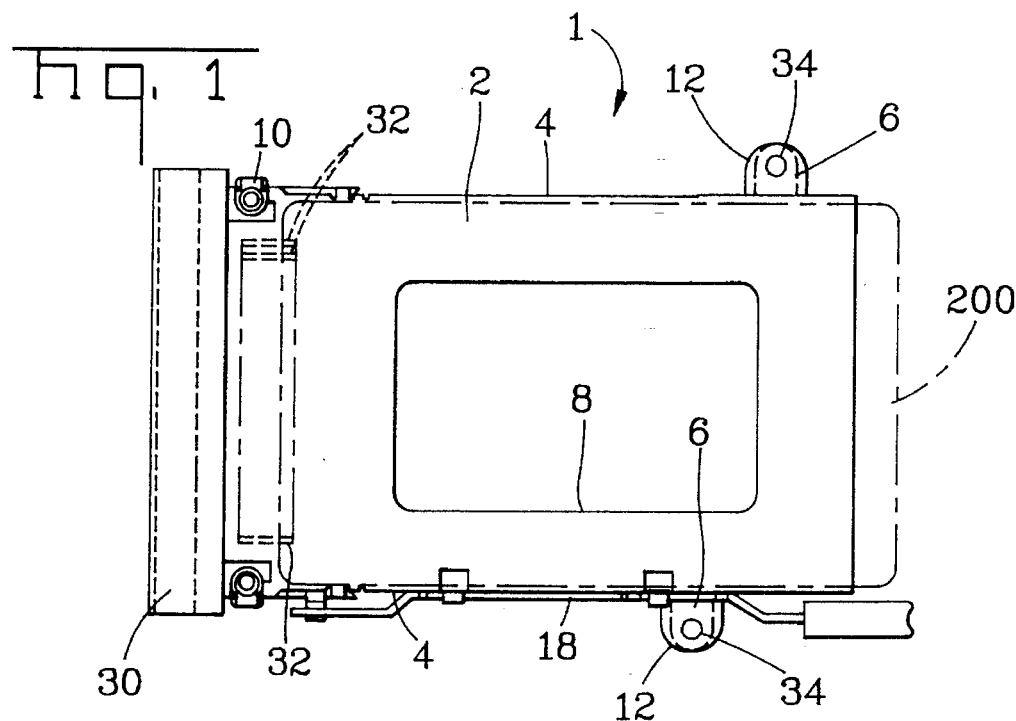
Fig. 1
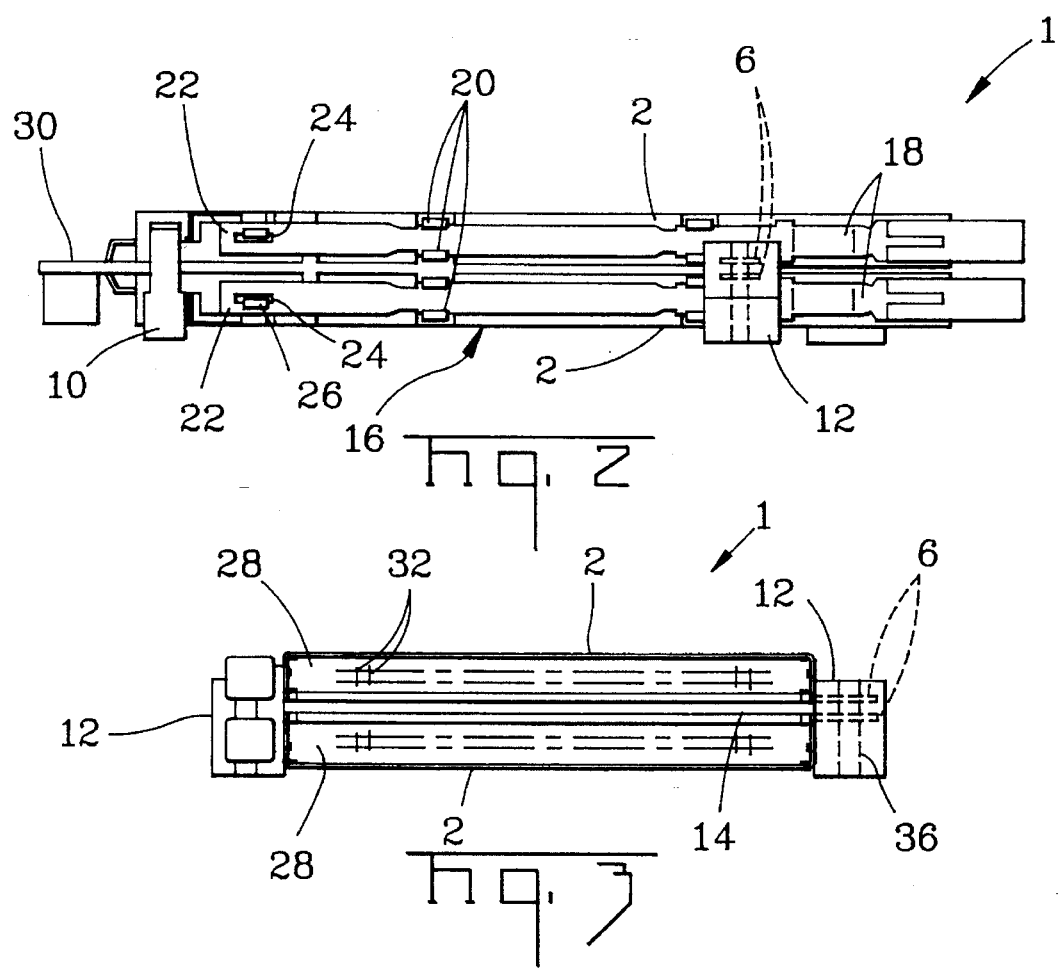
Fig. 2
Fig. 3

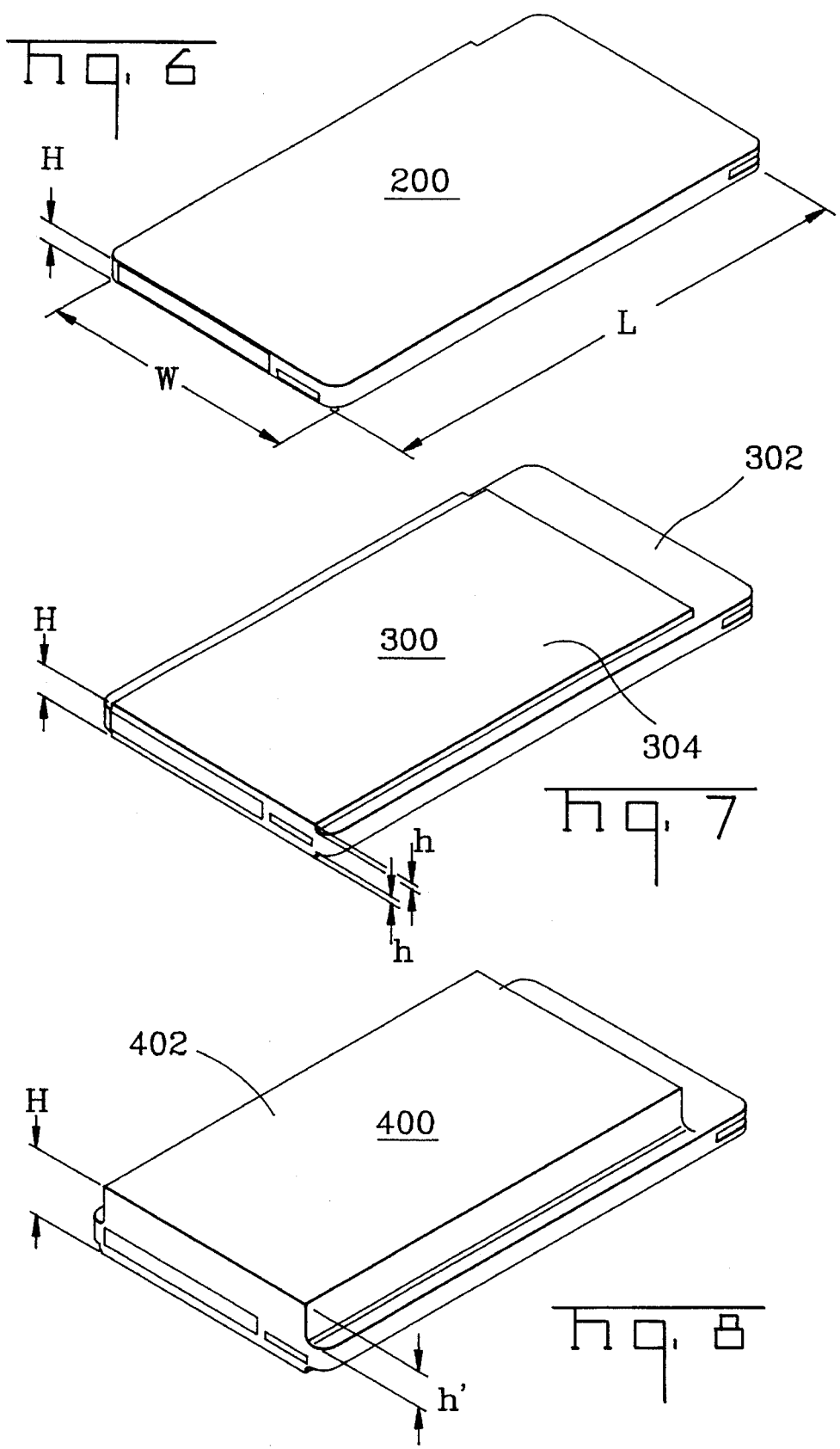

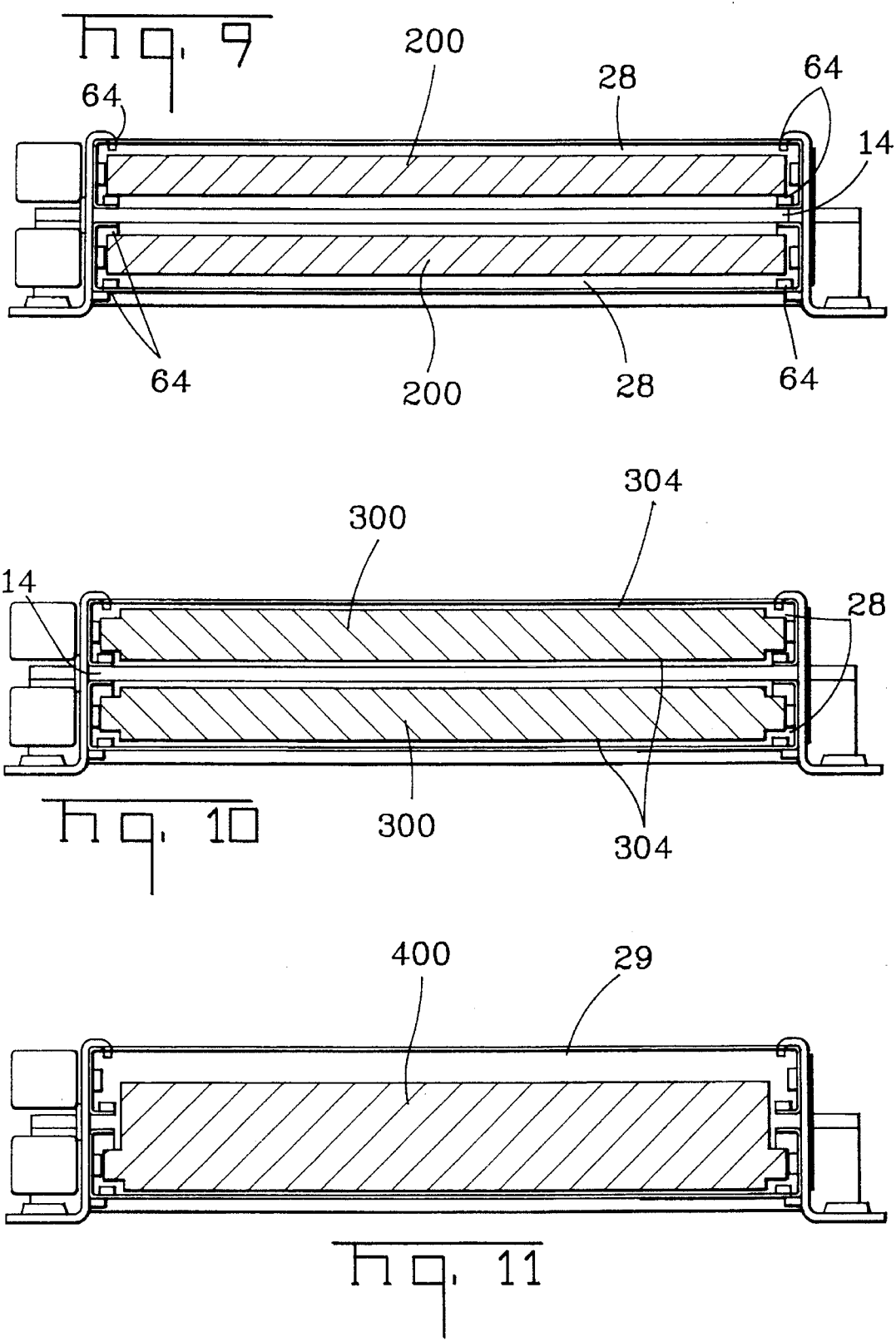

CARD EDGE CONNECTORS

This invention relates to card edge connectors designed for the insertion of cards, especially of memory cards carrying ICs (integrated circuits).

BACKGROUND OF THE INVENTION

Memory cards (below, simply "cards") are widely used in computers where they are connected, as required, to other components of the computer by means of card edge connectors. For example, a card edge connector is known in the art such as one described in Japanese Utility Model (1992)-87179 (See FIG. 13, item 100). The known card edge connector 100 consists of a frame 104 having an opening 102 provided for the insertion of a card (not shown in the Figure), an ejector 106 used for removal of the inserted card, and an ejection device 108. In addition, at the end opposite to the opening 102, there are pin contacts 110 for connection to the base board.

There are various types of cards, thin and thick, as shown in FIGS. 6–8. These cards, especially cards shown in FIGS. 6 and 7, cannot be used with the same card edge connector 100 having the opening of the same size, but they need specialized connectors for each type of card. Therefore, it was impossible to reduce the price of card edge connectors 100 or to arrange them using as little space as possible.

SUMMARY OF THE INVENTION

The card edge connector made according to this invention is a card edge connector having an opening for the insertion of cards, a device for the insertion and removal of the card and contacts for forming electrical connection characterized by the fact that the vertical partitions separating the opening of the above-mentioned card edge connector into cavities for the insertion of thin cards can be removed thus making it possible to insert thick cards spreading over more than one cavity into the same card edge connector.

BRIEF DESCRIPTION OF THE DRAWINGS

FIG. 1 is a top view of a connector according to the instant invention.

FIG. 2 is a side view of the connector shown in FIG. 1.

FIG. 3 is a front view of the connector shown in FIG. 1.

FIG. 6 is an oblique view of a thin card used in the connectors according to the present invention.

FIG. 7 is an oblique view of a thin card similar to one shown in FIG. 6 used in the connectors according the instant invention.

FIG. 8 is an oblique view of a thick card used in the connectors according to the instant invention.

FIG. 9 is a an end view of a connector according to the present invention with thin cards similar to one shown in FIG. 6 inserted in it.

FIG. 10 is a an end view of a connector according to the present invention with thin cards similar to one shown in FIG. 7 inserted in it.

FIG. 11 is a an end view of a connector according to this invention with a thick card similar to one shown in FIG. 8 inserted in it.

DETAILED DESCRIPTION OF THE INVENTION

Figure 4:
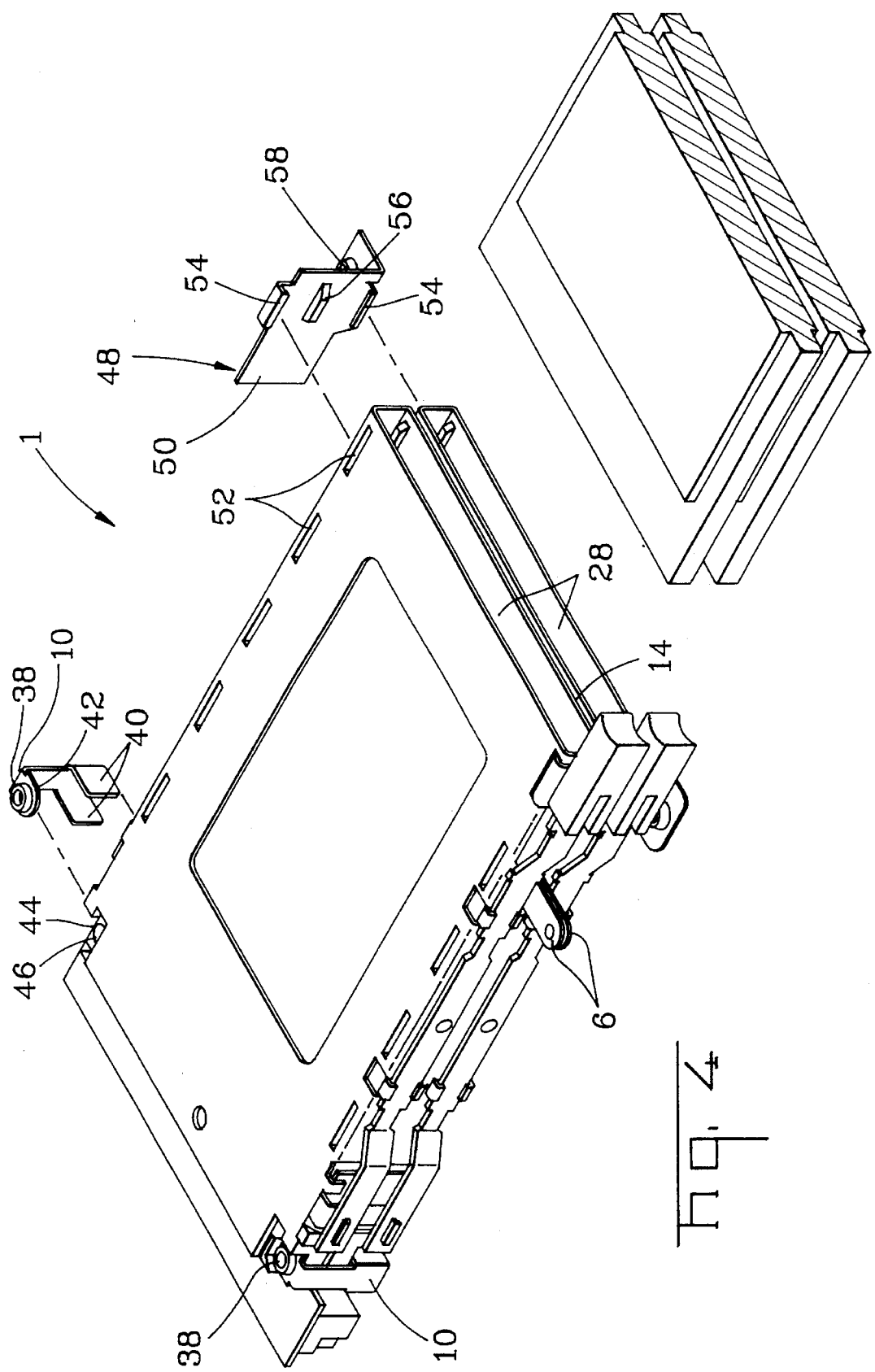
FIG. 4 is an oblique view of a connector similar to one shown in FIG. 1.

Figs. 1 through 3 represent a card edge connector (referred to herein below as "connector") according to this invention, with FIG. 1 being a top view, FIG. 2 a side view and FIG. 3 being a front view.

In the middle of FIG. 1, there is a frame stamped from a metal sheet material. Both ends 4 of frame 2 are bent to form U-shaped profiles with tongues 6 protruding outwardly. A nearly rectangular opening 8 is made in frame 2. As one can see in FIG. 3, a removable flat partition 14 is inserted between two frames 2 where they are secured by holders or fastners 10 (FIG. 2), 12 (FIG. 3). In this embodiment, two frames 2 are of different shapes, however they can be of the same shape as well. The rectangular shape shown in these drawings with a dash-and-dot line is the outline of an inserted card.

As shown in FIG. 2, the main body 16 formed by two frames 2 has two operating members 18 fitted in the sides of frames 2. Operating members 18 are secured on both sides by tabs 20 cut out from frame 2 and can slide back and forth in a longitudinal direction. In the front end of operating members 18, slit 24 is formed which is engaged with end 26 of the lever (not shown in the Figure) of the ejecting device. Ejecting devices are provided for each frame 2, and they make it possible to eject card 200 from the frame 2 by turning the other end of the lever around the fulcrum (not shown in the Figure) in the opposite direction. The main body 16 is connected to the base board 30 by means of contacts 32 located at one end of the main body between two frames 2.

In FIG. 3, cavities 28 are shown for the insertion of the cards which are formed by removable partition 14 and both frames 2. Each cavity 28 has two rows of contacts intended to form electrical connection with contacts on the card. In the fastener 12 there are grooves into which tongues 6 of frames 2 fit, so that when the tongues are completely inserted, holes 34 of tongues 6 are aligned with hole 36 of the fastener. Frames 2 are fixed to the base board (not shown in the Figure) by bolts (not shown in the Figure) passed through holes 34 of tongues 6 and hole 36.

FIG. 4 represents basically the same connector as the one shown in FIGS. 1–3. Fastener 10 is the same as the one shown in FIG. 1, and it consists of a flat shoulder 42 with a threaded opening 38 and two stiffening ribs 40 stamped from one piece of a metal sheet material. Flat shoulder 42 and stiffening ribs 40 snap into depressions 44 made in both sides of the main body 16. Depression 44 has a through hole 46, and when the connector is attached to the base board, a bolt (not shown in the Figure) is inserted from the side of the base board and it is screwed in the threaded opening 38, thus securing the connector to the board. Holder or fastner 48, which is different from the similar element shown in FIG. 1, is an L-shaped metal piece consisting of the main section 50 with tabs 54 bent at its edges which fit into slits 52 made in the main body 16. Approximately in the middle between tabs 54, there is a protrusion 56 made in the main section. This protrusion 56 fits between upper and lower frames 2 and keeps them at a predetermined distance. The holder 48 is used for securing the connector to the base board by means of a bolt (not shown in the Figure) passed through a threaded opening 58. In FIG. 4 shown also is the mutual relationship between the connector and two cards to be inserted into cavities 28.

Figure 5:
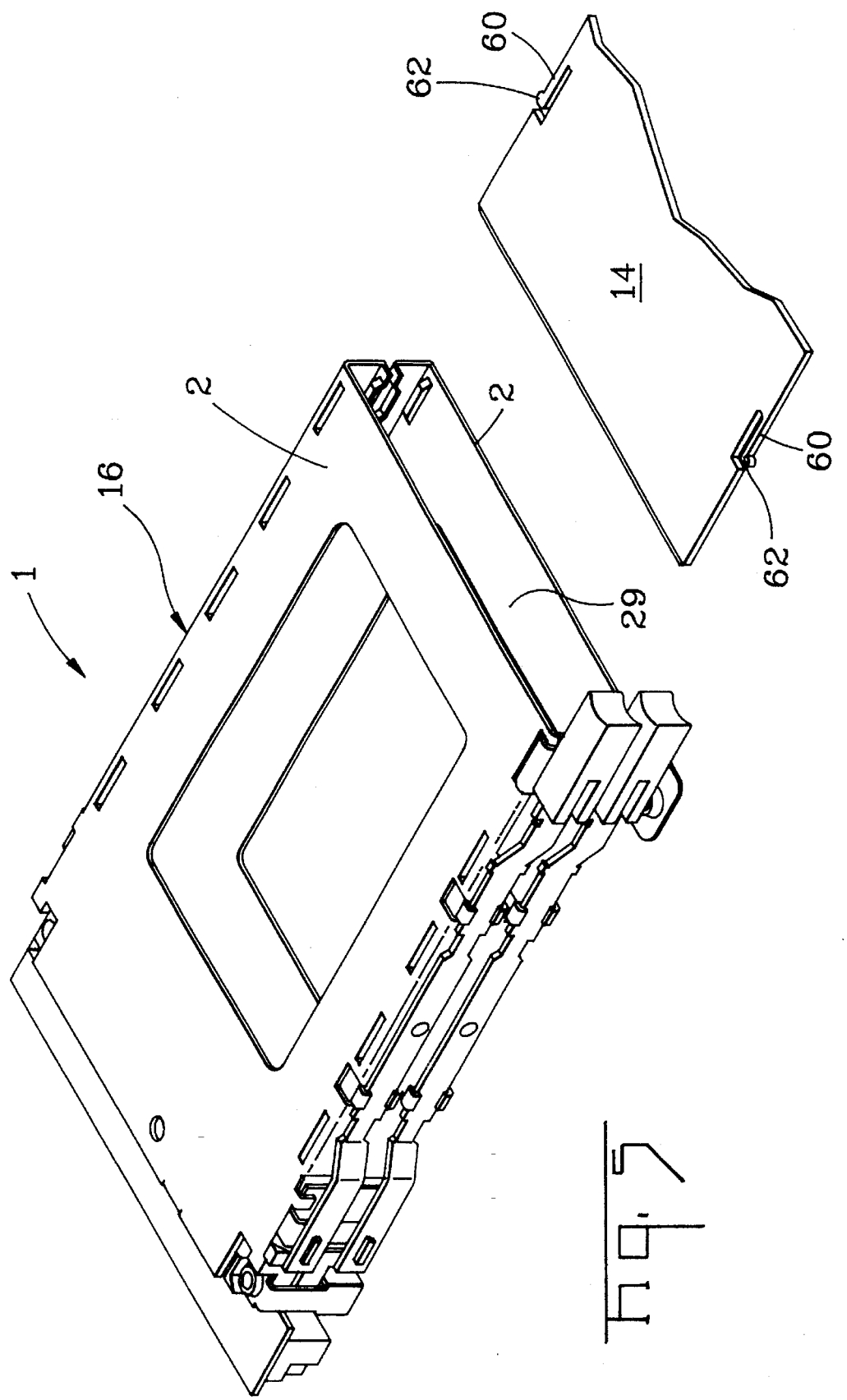
FIG. 5 is an oblique view of connector shown in FIG. 1 with the partition removed.

FIG. 5 is an oblique view of connector 1 shown in FIG. 2 with pulled out partition 14 forming cavity 29. At the both lateral sides of partition 14, there are lances 60. At the front ends of lances 60, lugs 62 are formed which are snapped between two protrusions (not shown in the Figure) made in frames 2 when partition 14 is inserted between frames 2, thus securing it in this position. The method to secure the partition is not limited to the locking by means of lugs 62 as other solutions may be implemented.

FIGS. 6 through 8 represent oblique views of cards to be inserted into connector 1. FIG. 6 is a thin card 200 with a thickness H of about 3.3 mm. Card 200 is of a rectangular shape, and is inserted in connector 1 with its left side (in the figure) first. FIG. 7 represents card 300 which is slightly thicker than card 200, and has a thickness of approximately 5 mm. On both of the surfaces of card 300 there are rectangular protrusions 04 whose thickness (h) is about 0.8 mm. The protrusions 304 contain IC's. FIG. 8 represents card 00 that is even thicker than card 300. Its thickness H is about 10.5 mm. On its smaller surface, there is a rectangular protrusion 402 similar to protrusions on card 300 whose thickness is about 6.4 mm. The protrusion 402 also contains IC's. The contacts of card 400 are arranged in rows like those of cards 200 and 300, and they match contacts 32 located in the lower section of cavity 28 of edge connector 1. All of the cards, 200, 300 and 400, have the same width (54 mm) and length (86 mm).

The hatched areas in FIGS. 9–11 represent the cards 200, 300 and 400 inserted in cavities 28 of connector 1. In FIG. 9, the cards 200 are inserted in their respective cavities 28. The upward or downward movement of cards 200 are prevented by lugs 64 made in upper and lower walls of frames 2. In FIG. 10, cards with a thickness of 5 mm are inserted in the cavities 28. Protrusions 304 fit into empty space of cavities 28. Cards 200 may be used with cards 300 in the same connector. In FIG. 11, partition 14 is removed, and the thickest card 400 (thick card) is inserted. Due to removal of partition 28, two cavities 28 are combined in one larger cavity 29 which can accommodate card 400. In such a case, contacts of card 400 (not shown in the Figure) form electrical connection with contacts 32 located at the lower portion of cavity 28 of connector 1.

Figure 12:
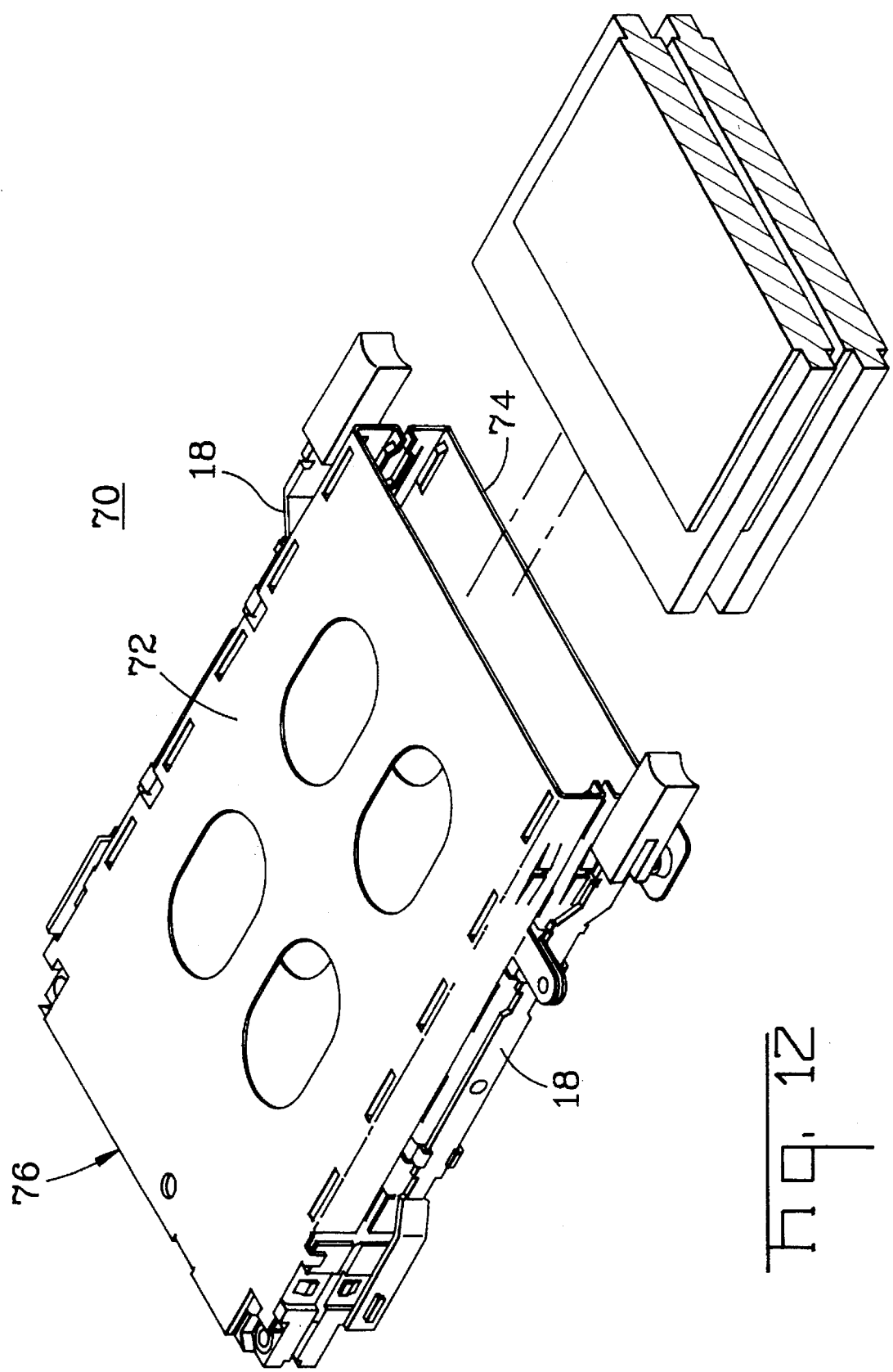
FIG. 12 is an oblique view of a connector according to another embodiment of the present invention.
Figure 13:
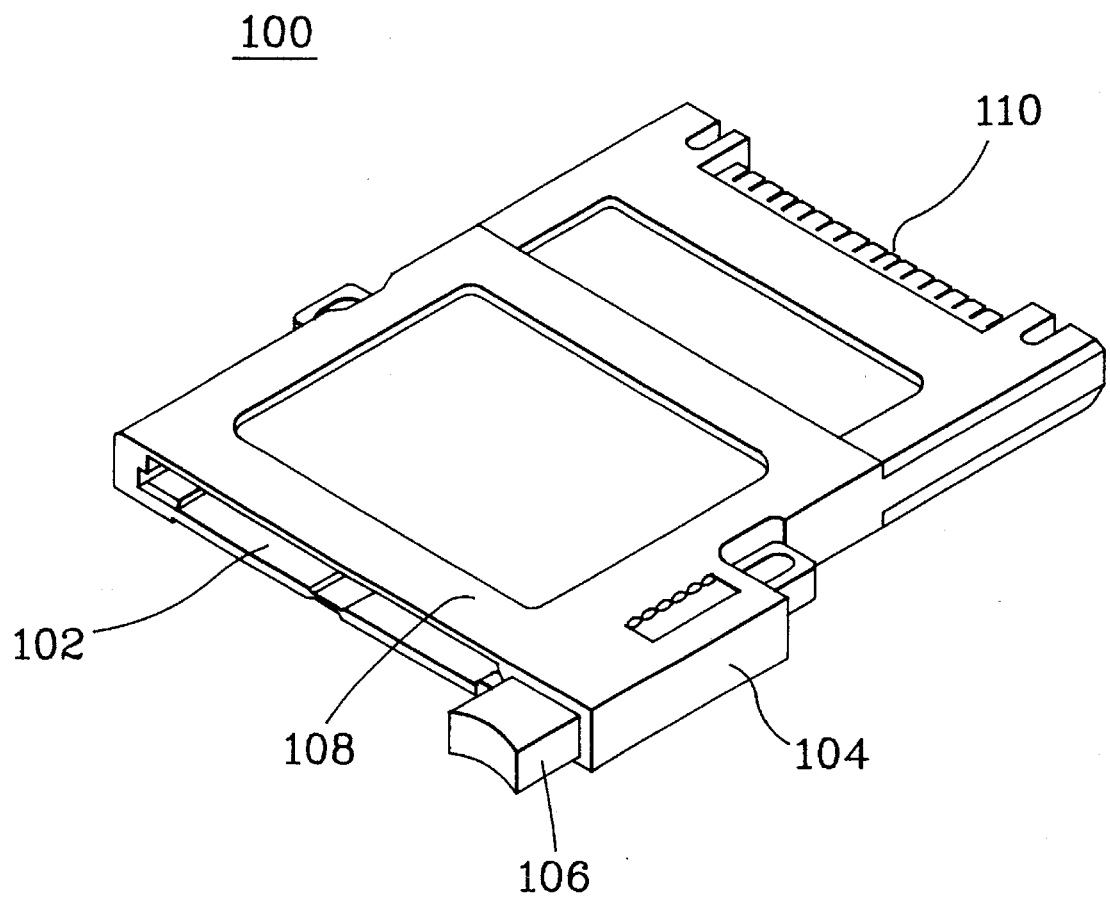
FIG. 13 is an oblique view of a conventional connector.

FIG. 12 depicts connector 70 according to another embodiment of this invention. In this case, fasteners 10 and 12, as well as partition 14 have been removed. Upper and lower frames 2 are identical and are assembled together. Operating members 18 are placed on both sides of the main body 76. Since the operating members 18 are located at the left and right sides of the cavities 29, they are easy to operate.

The connectors made according to the present invention are not limited to the embodiments discussed above, but may also comprise various modifications. For example, the arrangement of the contacts on the base board can be changed in such a manner that thin cards are in the same plane or face each other. Contacts can also be located on the outer surface of the frame.

As described above, the connectors made according to this invention are suitable both for thin and thick cards, due to the fact that the partition between cavities can be easily removed or reinstalled. Since it is possible to use the same connector with cards of different types, the installation of individual connectors for each type of cards can be avoided, thus saving the space occupied by connectors and reducing its cost. The connectors are especially effective in saving space in personal computers of the notebook type. These connectors are very flexible from the standpoint of use in multiple application environment.

We claim:

1. A card edge connector for use with an electrical circuit, comprising:

a main body portion having two frame portions which are joined together to form a main cavity in the main body, said main body portion has first and second operating members joined to a side thereof and joined to an ejecting device for operatively ejecting a pair of cards from the main cavity;

said main body further including electrical contacts at one end of the main cavity for connection to said electrical circuit, and an opening at the other end of the main cavity for receiving said cards; and wherein a removable partition is provided between the frame portions thereby forming two smaller cavities for receiving said cards, the partition being removably inserted through said opening.

2. The card edge connector of claim 1, wherein removable fasteners are provided for mounting the card edge connector to a surface.

3. The card edge connector of claim 1, wherein the partition is a substantially planar member with resiliently deflectable locking lances for locking the partition in place in the cavity.

4. The card edge connector of claim 1, wherein a pair of locking lances are provided on the partition for locking the partition to the main body.

5. The card edge connector of claim 1, wherein the electrical contacts comprise two rows of contacts, one row for each of said cards.

6. The card edge connector of claim 1, wherein inner surfaces of the frames include lugs for retaining the cards in place.

7. The card edge connector of claim 1, wherein the operating members are located at opposite sides of the cavity.

8. The card edge connector of claim 1, wherein each of the cards has a thickness, and the thickness of one card is the same as the thickness of the other of said pair of cards.

9. The card edge connector of claim 1, wherein each of the cards has a thickness, and the thickness of one card is the greater than the thickness of the other of said pair of cards.

10. A memory card connector for electrical connection to memory cards, comprising:

a main body member including frame members mounted one on top of the other forming a main cavity in said main body member, said frame members having sides with turned-in ends;

operating members slidably mounted along respective sides of said frame members;

ejecting devices mounted on respective frame members and operatively connected to respective frame members for ejecting one or a pair of memory cards from said main body member; and fasteners removably mounted onto said frame members adjacent front ends and rear ends thereof thereby maintaining said frame members in position forming said main cavity.

11. A memory card connector as claimed in claim 10, wherein said frame members are stamped from sheet metal.

12. A memoory card connector as claimed in claim 11, wherein tabs are cut out form said frame members thereby forming mounting members for mounting said operating members onto the respective sides of the frame members.

13. A memory card connector as claimed in claim 12, wherein said operating members are mounted along opposite sides of said main body member.

14. A memory card connector as claimed in claim 10, wherein a removable partition is mounted between the turned-in ends of said sides thereby forming two cavities of said main cavity.

15. A memory card connector as claimed in claim 10, wherein the front end removable fasteners have flat shoulders and stiffening ribs fitted into depressions located in the sides of said frame members.

16. A memory card connector as claimed in claim 10, wherein the rear end removable fasteners are L-shaped including a main section having bent-in tabs at edges thereof which fit into slits in said main body member and a protrusion fitting between said frame members keeping them at a predetermined distance.

* * * * *